United States Patent [19]

Jett

[11] 4,318,624
[45] Mar. 9, 1982

[54] SLIP CLUTCH FOR A BIN LEVEL INDICATOR

[76] Inventor: Richard G. Jett, 5N634 Hanson Rd., Saint Charles, Ill. 60174

[21] Appl. No.: 180,631

[22] Filed: Aug. 25, 1980

[51] Int. Cl.³ .................. B01F 13/04; B01F 15/02
[52] U.S. Cl. .............................. 366/349; 64/30 D; 340/615; 366/142
[58] Field of Search .............. 366/142, 349, 348, 279, 366/281, 282, 283, 287, 288, 284; 340/615, 167; 64/27, 28 R, 29, 30 R, 30 D, 27 CS; 200/61.21

[56] References Cited

U.S. PATENT DOCUMENTS

| | | | |
|---|---|---|---|
| 2,698,362 | 12/1954 | Bozich | 366/142 |
| 2,851,553 | 9/1958 | Grostick | 340/615 |
| 2,909,766 | 10/1959 | Bozich | 366/142 |
| 3,157,258 | 11/1964 | Cronholm | 64/28 |
| 3,213,645 | 10/1965 | Pease | 64/30 R |
| 3,745,790 | 7/1973 | Ryan | 64/29 |
| 3,893,554 | 7/1975 | Wason | 64/30 E |
| 3,941,956 | 3/1976 | Delin | 340/617 |
| 4,211,966 | 7/1980 | Sweet | 340/617 |

Primary Examiner—Robert W. Jenkins

[57] ABSTRACT

A slip clutch for use in a bin level indicator or the like between a motor operated driving shaft and a driven shaft which rotates paddle means adapted to be impeded or stopped by the rising material in a bin or the like, comprising a hollow end portion on the driven shaft, the driving shaft being rotatably received in an axial bore in such hollow end portion, and a spring loop mounted around the hollow end portion for rotation therewith, such hollow end portion having a cutaway portion forming a recess communicating with such bore, the driving shaft having a flat surface on one side thereof, the spring loop extending into such recess and initially into engagement with such flat surface to transmit torque between the driving and driven shafts, the spring loop being flexible outwardly by the flat surface on the driving shaft to provide for slipping between the driving shaft and the driven shaft when the torque being transmitted by the slip clutch exceeds a predetermined value, the spring loop preferably being made of spring wire.

12 Claims, 13 Drawing Figures

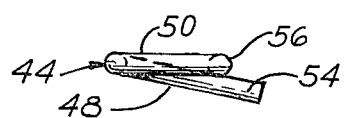
FIG. 2
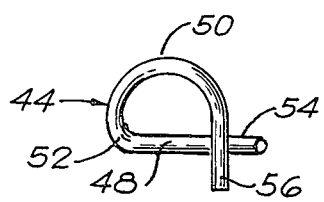
FIG. 3
FIG. 5
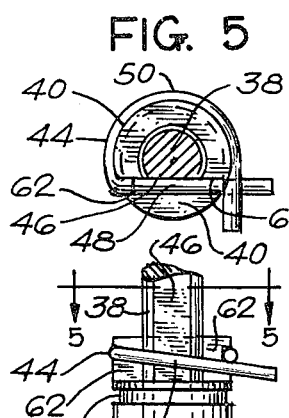
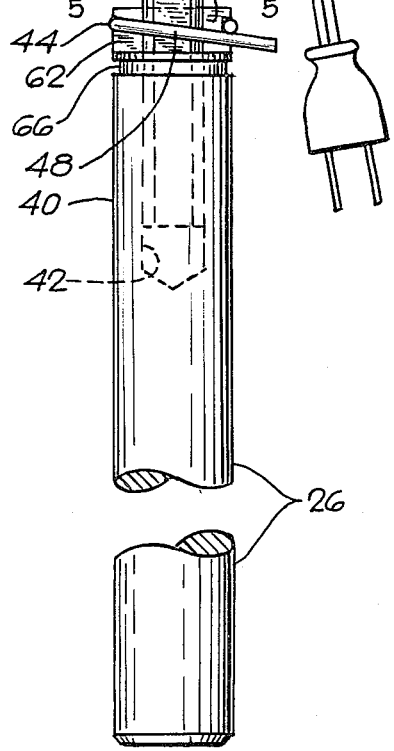
FIG. 4
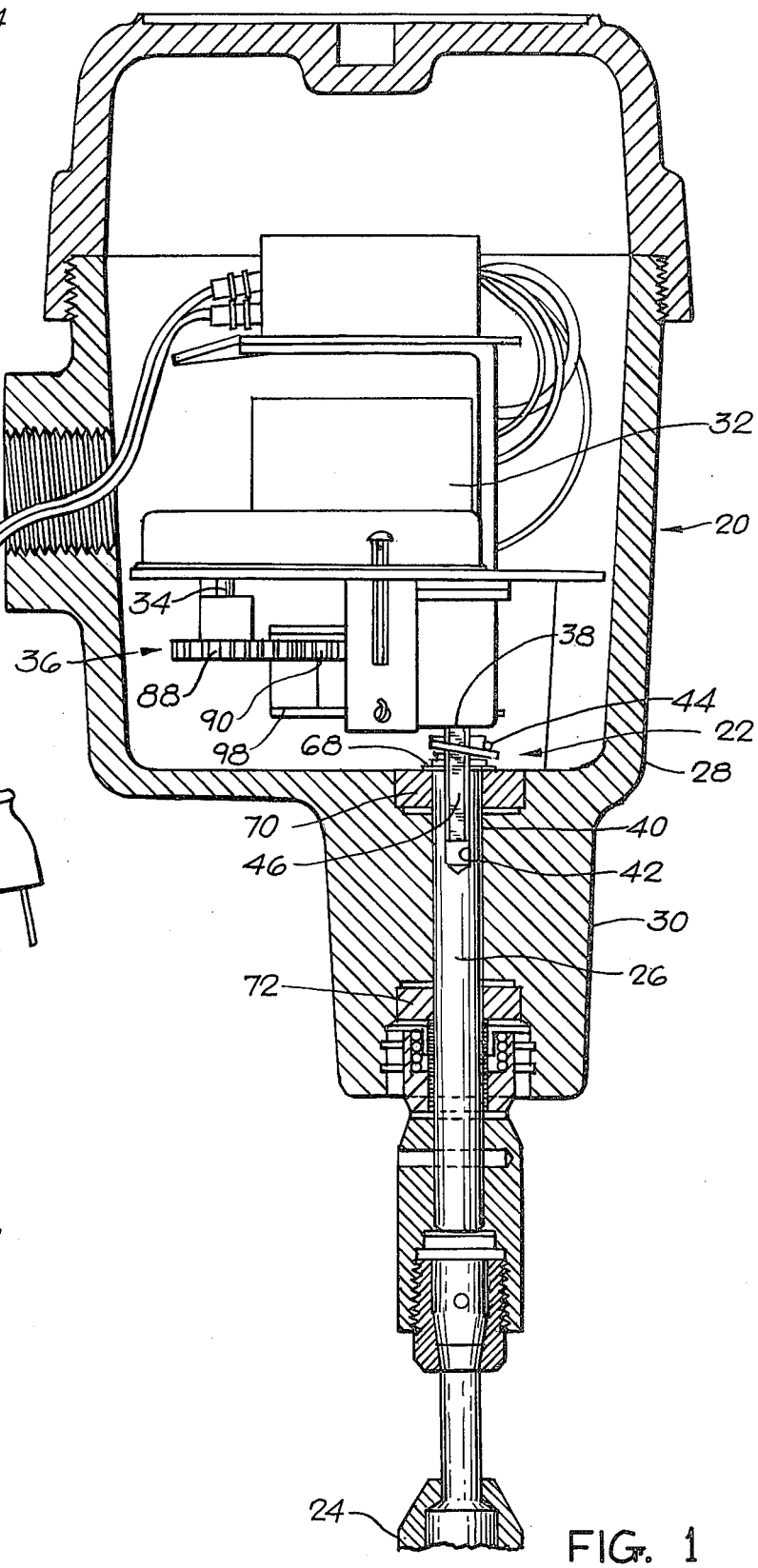
FIG. 1

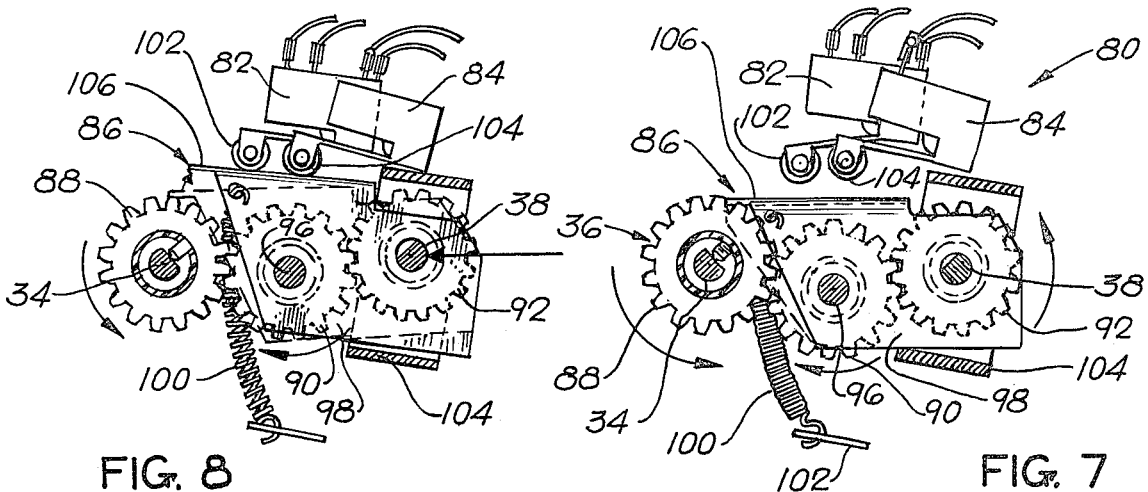
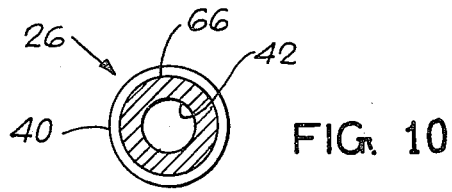
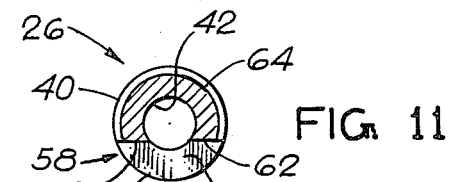
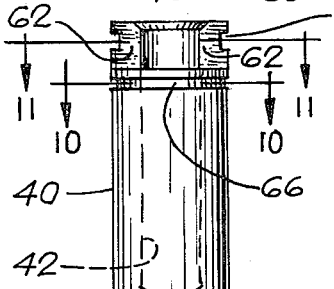
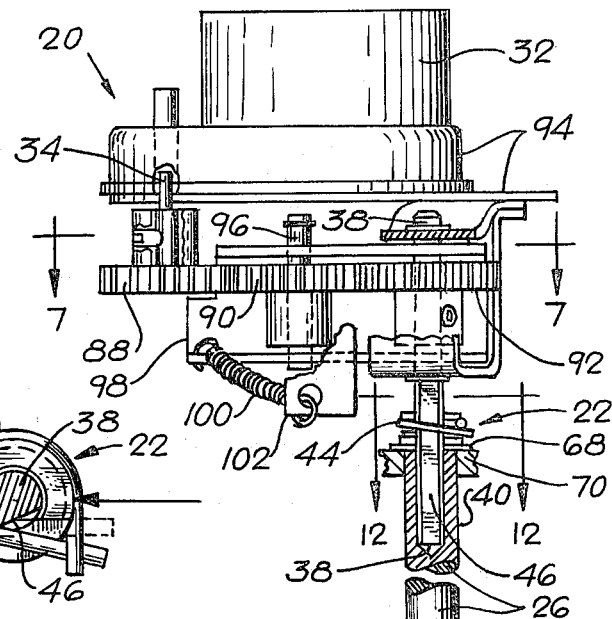
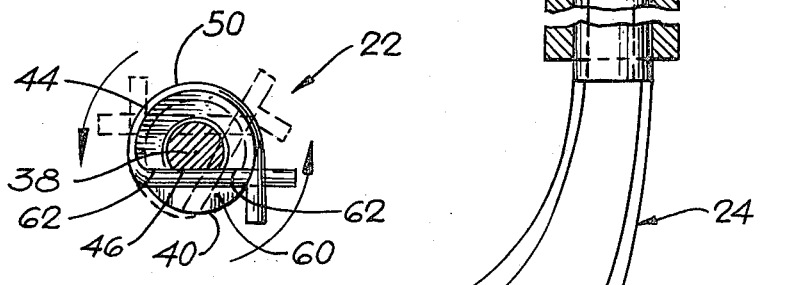
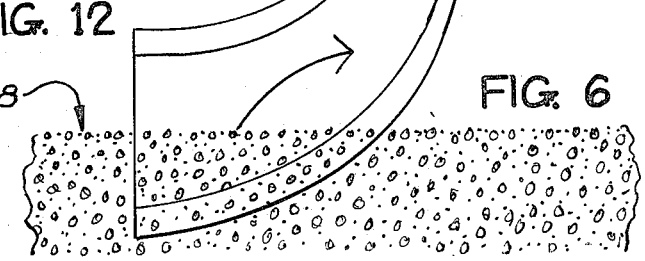

SLIP CLUTCH FOR A BIN LEVEL INDICATOR

This invention relates to a new and improved slip clutch which is especially well adapted for use in a motorized level indicator of a type often used to monitor and control the level of granular material or the like in a bin, hopper, tank or other receptacle.

A bin level indicator of this type often comprises a rotatable driven shaft which carries rotatable paddle means adapted to be engaged by the material in the bin, if the material rises above the level at which the paddle means are mounted. The rising material will stop or at least impede the rotation of the paddle means. The slip clutch is employed between the driven paddle shaft and a driving shaft which is connected by a drive train to an electric motor, whereby the driving shaft is rotated. The slip clutch provides for slippage between the driving shaft and the driven paddle shaft, when the rotation of the paddle means is stopped or impeded by the rising granular material in the bin. There is an increase in the torque developed by the motor when the rotation of the paddle means is impeded or stopped, and such increase causes the slippage at the slip clutch. Moreover, such increase in the torque is employed to operate control means, which may include one or more electrical switches, adapted to energize an alarm or perform other control functions. For example, the control means may stop a conveyor or the like which is causing the granular material to flow into the bin. By way of further example, the control means may actuate a gate or conveyor which will cause the material to flow out of the bin. Thus, the control means may be employed in an automatic system for maintaining the level of the material between prescribed upper and lower limits in the bin.

One object of the present invention is to provide a new and improved slip clutch which is particularly effective and advantageous for use in a bin level indicator of the foregoing character.

Another object is to provide a new and improved slip clutch which is extremely compact, inexpensive and easy to manufacture, yet is highly effective and reliable.

To achieve these objects, the present invention may provide a slip clutch comprising a rotatable driven shaft having a hollow end portion with an axial bore therein, a rotatable driving shaft rotatably received in such bore, and a spring loop mounted around the hollow end portion of the driven shaft for rotation therewith, such hollow end portion of the driven shaft having a cutaway portion forming a recess communicating with the bore, such driving shaft having a generally flat surface on one side thereof, such spring loop extending into such recess and initially into engagement with the flat surface on the driving shaft to transmit torque between the driving shaft and the driven shaft, such spring loop being flexible outwardly by the flat surface on the driving shaft to provide for slippage between the driving shaft and the driven shaft when the torque being transmitted by the slip clutch exceeds a predetermined value.

The spring loop is preferably made of spring wire.

The hollow end portion of the driven shaft is preferably formed with a peripheral groove for receiving and retaining the spring loop.

Preferably, the spring loop is generally D-shaped and is provided with a substantially straight portion and a generally semicircular portion, with one end thereof connected to one end of the straight portion. Initially, the straight portion engages the flat surface on the driving shaft. The straight portion is received in the recess in the driven shaft. When the rotation of the paddle means is stopped, the straight portion of the spring loop is flexed outwardly by the flat surface on the driving shaft, to provide for slippage between the driving and driven shafts. The semicircular portion of the spring loop is received and retained in the peripheral groove, formed in the driven shaft.

Further objects, advantages and features of the present invention will appear from the following description, taken with the accompanying drawings, in which:

FIG. 1 is a general longitudinal section, taken through a bin level indicator which incorporates a slip clutch to be described as an illustrative embodiment of the present invention.

FIGS. 2 and 3 are elevational and plan views of a spring loop employed in the slip clutch.

FIG. 4 is a fragmentary enlarged elevation of the slip clutch.

FIG. 5 is a section, taken generally along the line 5—5 in FIG. 4.

FIG. 6 is a somewhat diagrammatic elevational section, similar to FIG. 1, but showing additional details of the bin level indicator and the slip clutch.

FIG. 7 is a horizontal section, taken generally along the line 7—7 in FIG. 6, to show details of the drive train and the torque responsive control means.

FIG. 8 is a horizontal section similar to FIG. 7, showing changes in the positions of the components to operate the control means.

FIG. 9 is a fragmentary enlarged elevation of the driven shaft.

FIGS. 10 and 11 are sectional views through the driven shaft, taken generally along the lines 10—10 and 11—11 in FIG. 9.

FIG. 12 is a cross section, taken generally along the line 12—12 in FIG. 6, to show the slip clutch as it appears during normal rotation, when slippage is not occurring.

FIG. 13 is a view similar to FIG. 12, showing the manner in which slippage occurs.

As just indicated, FIGS. 1 and 6 of the drawings illustrate a bin level indicator 20 which incorporates a slip clutch 22 to be described as an illustrative embodiment of the present invention. The bin level indicator 20 is adapted to be employed for monitoring and controlling the level of granular material or some other bulk material in a bin, hopper, tank or any other suitable receptacle. The bin level indicator 20 is of the motorized type, having rotatable paddle means 24, mounted on or otherwise rotatable by a driven paddle shaft 26. The paddle means 24 may assume various forms, such as the illustrated single curved paddle. The driven paddle shaft 26 extends between the inside and the outside of an indicator housing 28, in which the shaft 26 is rotatably mounted.

As shown in FIG. 1, the indicator housing 28 has a mounting stub 30 which is adapted to be mounted in some suitable manner on the wall of a bin or any other appropriate receptacle. For example, the mounting stub 30 may be formed with pipe threads, adapted to be received by a pipe flange, mounted over a suitable opening in the wall of the bin. The paddle shaft 26 extends through the opening in the wall of the bin, so that the paddle 24 is rotatable within the bin.

If the granular material rises in the bin to the level of the paddle 24, the material stops or at least impedes the rotation of the paddle. The bin level indicator 20 is adapted to perform control functions when the rotation of the paddle 24 is stopped or impeded.

As shown in FIGS. 1 and 6, the bin level indicator 20 includes an electric motor 32, mounted within the housing 28, to provide the motive power for rotating the paddle means 24. The motor 32 may be of the gear reduction type, having a low speed output shaft 34. A drive train 36 is connected between the output shaft 34 and a driving shaft 38, constituting one of the components of the slip clutch 22.

The slip clutch 22 provides for slippage between the driving shaft 38 and the driven shaft 26, when the torque transmitted by the slip clutch exceeds a predetermined value. Such slippage will occur if the rotation of the paddle means 24 is stopped or sufficiently impeded by the rising bulk material in the bin. The slip clutch 22 prevent any possible damage to the motor 32 or the drive train 36, due to stoppage of the paddle means 24.

As shown in FIGS. 1, 4 and 9, the driven paddle shaft 26 has a hollow end portion 40 having an axial bore 42 therein. The hollow end portion 40 of the driven shaft 26 constitutes another component of the lip clutch 22. The driving shaft 38 is rotatably received in the axial bore 42. The slip clutch 22 forms a slippable driving connection between the driving shaft 38 and the hollow end portion 40 of the driven shaft 26.

The slip clutch 22 also comprises a spring loop 44 which is mounted around the hollow end portion 40 of the driven shaft 26 and is rotatable therewith. Initially, the spring loop 44 engages a flat surface 46 on one side of the driving shaft 38. Due to such engagement, the spring loop 44 is capable of transmitting considerable torque between the driving shaft 38 and the hollow end portion 40 of the driven shaft 26. Thus, if the rotation of the paddle means 24 is not impeded, the spring loop 44 forms a coupling between the driving shaft 38 and the driven shaft 26, so that the electric motor 32 produces continuous rotation of the paddle means 24. Such rotation is indicated in FIG. 12.

As shown in FIG. 6, the bin or other receptacle may contain granular or other bulk material 48, which may rise to the level of the paddle 24 and may stop or impede the rotation of the paddle. If the paddle 24 is stopped or sufficiently impeded, the torque transmitted by the slip clutch 22 increases to such a value that the spring loop 44 is flexed outwardly by the flat surface 46 on the driving shaft 38, as shown in FIG. 13. In this way, slippage occurs between the driving shaft 38 and the spring loop 44, if the torque being transmitted by the slip clutch 22 exceeds a predetermined value.

As shown in FIGS. 2–5, the spring loop 44 is preferably in the form of an open ring, bent from a length of spring wire. The illustrated spring loop 44 is generally D-shaped and is provided with a substantially straight portion 48 and a generally semicircular portion 50. One end of the straight portion 48 and one end of the semicircular portion 50 are connected integrally together, as indicated at 52. The straight portion 48 and the semicircular portion 50 have respective free end portions 54 and 56 which cross and overlap, as will be evident from FIGS. 2 and 3.

It will be seen from FIGS. 5 and 12 that the straight portion 48 of the spring loop 44 initially engages the flat surface 46 on the driving shaft 38, so that torque is transmitted between the driving shaft 38 and the spring loop 44. When the torque exceeds a predetermined value, the flat surface 46 flexes the straight portion 48 outwardly, as shown in FIG. 13, so that slippage occurs between the shaft 38 and the spring loop 44.

As shown in FIGS. 9 and 11, the hollow end portion 40 of the driven shaft 26 is preferably formed with a cutaway end portion 58, forming a recess 60 in which the spring loop 44 is received. The recess 60 provides flat surface means, illustrated as a pair of flat surfaces 62 engageable with the straight portion 48 of the spring loop 44. Such engagement causes the driven shaft 26 to rotate with the spring loop 44. The hollow end portion 40 of the driven shaft 26 is also preferably formed with a peripheral groove 64 for receiving and retaining the semicircular portion 50 of the spring loop 44. For assembly around the end portion 40 of the shaft 26, the spring loop 44 can be flexed outwardly so that it can be slipped around the end portion 40, into the retaining groove 64. It will be seen that the groove 64 extends partway around the end portion 40, and that the ends of the groove 64 communicate with the recess 60.

As shown in FIGS. 9 and 10, the end portion 40 of the shaft 26 is also formed with another peripheral groove 66, spaced below the recess 60, for receiving a retaining ring 68 (FIGS. 1 and 6), whereby the shaft 26 is retained in the indicator housing 28. The shaft 26 is rotatably supported by first and second bearings 70 and 72, mounted in the housing 28. The retaining ring 68 engages the first bearing 70.

The bin level indicator 20 comprises control means 80 for actuating an alarm or performing other control functions, in response to increased torque developed by the electric motor 32, when the rotation of the paddle means 24 is stopped or sufficiently impeded by the rising material 48 in the bin. As shown in FIGS. 7 and 8, the control means 80 may include two electrical switches 82 and 84, operable in response to increased torque, developed by the motor 32 and transmitted by the drive train 36 to the driving shaft 38. In this case, the switch 82 is employed to deenergize the electric motor 32, while the switch 84 is available to perform other control functions, such as actuating an alarm, starting or stopping a conveyor, or operating a gate or valve, to regulate the flow of the bulk material 48, into or out of the bin.

As shown in FIGS. 6–8, the drive train 36 comprises torque responsive means 86 for operating the control switches 82 and 84. More specifically, the drive train 36 comprises a gear 88 mounted on the motor shaft 34 and rotatable therewith, an idler gear 90, meshing with the gear 88, and a gear 92, meshing with the idler gear 90 and mounted on the driving shaft 38 so as to be rotatable therewith. All three gears, 88, 90 and 92, rotate continuously when the electric motor 32 is running.

The motor 32 has a housing or frame 94 which includes means for rotatably supporting the gears 88 and 92 for rotation about axes which are parallel and spaced a fixed distance apart. However, the idler gear 90 is rotatably supported by a shaft 96 which is mounted on a swingable carriage or rocker 98, swingable about the axis of the driving shaft 38. The carriage 98 is resiliently or yieldably biased to its initial position, as shown in FIG. 7, by spring means, illustrated as a coil spring 100, connected between the carriage 98 and a fixed anchor bracket 102. As shown in FIG. 7, the carriage 98 is biased in a counterclockwise direction by the spring 100, against a fixed stop bracket or member 104.

When the gears 88, 90 and 92 are transmitting a normal amount of torque, sufficient to rotate the paddle 24, when the granular material 48 is not engaging the paddle, the spring 100 is strong enough to hold the carriage 98 against the stop 104. In this position of the carriage 98, the control switches 82 and 84 are not operated, as will be seen from FIG. 7.

When the paddle 24 is stopped or sufficiently impeded by the rising granular material 48, the increased torque, developed by the electric motor 32 and transmitted by the gears 88, 90 and 92, causes the carriage 98 to swing clockwise against the biasing action of the spring 100, as shown in FIG. 8. Such swinging movement of the carriage 98 causes the carriage to operate the switches 82 and 84. It will be seen that the switches 82 and 84 have operating members 102 and 104 which are engageable by a flange 106 on the carriage 98, when the carriage is swung clockwise, as shown in FIG. 8. The operation of the switch 82 deenergizes the electric motor 32, so that it stops operating. The operation of the switch 84 may be employed to perform various control functions. Thus, a gate, conveyor or other device may be actuated to cause the granular material 48 to flow out of the bin. By way of further example, the operation of the switch 84 may be employed to actuate a gate, conveyor or other device so that the granular material 48 will no longer flow into the bin. The switch 84 may also be employed to actuate an alarm.

When the level of the bulk material 48 drops so that the paddle 24 is again free to rotate, the spring 100 returns the carriage 98 in a counterclockwise direction, so that the control switches 82 and 84 are no longer operated. The switches 82 and 84 are of a spring return type, so that they return to their initial positions, as shown in FIG. 7. The switch 82 again energizes the electric motor 32, so that the paddle 24 is continuously rotated by the motor.

During normal operation of the bin level indicator 20, when the paddle 24 is unimpeded by the granular material 48 in the bin, the slip clutch 22 transmits the normal torque between the driving shaft 38 and the driven shaft 26, so that the paddle 24 is continuously rotated by the electric motor 32. The flat surface 46 on the driving shaft 38 engages the straight portion 48 of the spring loop 44, to transmit the normal driving torque to the spring loop. The straight portion 48 engages the flat surfaces 62 on the end portion 40 of the driven shaft 26, to transmit the driving torque between the spring loop 44 and the driven shaft 26.

When the granular or other bulk material 48 rises in the bin so as to engage the paddle 24, the rotation of the paddle will be impeded or stopped. As a result, the torque being transmitted by the slip clutch 22 is increased. If such torque exceeds a predetermined value, the flat surface 46 on the driving shaft 38 causes the straight portion 48 of the spring loop 44 to flex outwardly, as shown in FIG. 13, by a camming action, until the flat surface 46 escapes from the straight portion 48, whereupon slippage occurs in the slip clutch 22, between the driving shaft 38 and the driven shaft 26. The driving shaft 38 rotates in the axial bore 42 formed in the hollow end portion of the shaft 26. The slippage of the clutch 22 prevents any possible damage to the electric motor 32, due to the stoppage of the paddle 24.

Generally, the increased torque also causes the carriage 98 to swing clockwise against the biasing force of the spring 100, so that the flange 106 on the carriage operates the switches 82 and 84. The operation of the switch 82 stops the motor 32. However, the slip clutch 22 protects the electric motor 32, in the event that the motor is not deenergized by the switch 82.

When slippage occurs at the slip clutch 22, as shown in FIG. 13, the driving shaft 38 may rotate through approximately one revolution, until the flat surface 46 again engages the straight portion 48 of a spring loop 44. If the driven shaft 26 is then free to rotate, the slip clutch 22 will again transmit the normal driving torque between the driving shaft 38 and the driven shaft 26.

It will be evident that the slip clutch 22 is extremely compact, inexpensive and easy to manufacture. Nevertheless, the slip clutch 22 is highly effective, durable, and reliable in operation.

The portion 46 of the driving shaft 38 is in the nature of a cam portion which is engageable with the portion 48 of the spring loop or ring 44. The portion 48 is in the nature of an arm portion which is received in the recess 60 formed in the driven shaft 26. The recess 60 communicates with the axial bore 42 in the driven shaft 26, so that the arm portion 48 has access to the cam portion 46 of the driving shaft 38.

It will be understood that the roles of the driving and driven shafts can be interchanged, without affecting the operation of the slip clutch 22. Thus, the shaft 26 may be the driving shaft, while the shaft 38 may be the driven shaft.

I claim:

1. In a level indicator for indicating the level of granular material or the like in a bin or other container, rotatable paddle means for engagement by the rising material to impede the rotation of said paddle means, a rotatable paddle shaft for causing rotation of said paddle means, an electric motor, a rotatable driving shaft, a drive train connected between said electric motor and said driving shaft for causing rotation of said driving shaft, and control means operable by a predetermined increase in the torque developed by said motor due to engagement of said paddle means by the rising material, the improvement comprising a slip clutch forming a slippage driving connection between said driving shaft and said paddle shaft, said slip clutch including a hollow driven end portion of said paddle shaft, said hollow driven end portion having an axial bore therein, said driving shaft being rotatably received in said bore, said slip clutch including a generally D-shaped open spring loop mounted around said hollow end portion of said paddle shaft, said spring loop having a substantially straight portion and a generally semicircular portion connected at one end to one end of said straight portion, said hollow end portion of said paddle shaft having a cutaway portion forming flat surface means communicating with said bore, said driving shaft having a flat surface on one side thereof, said straight portion of said spring loop being initially in engagement with said flat surface of said driving shaft and said flat surface means of said paddle shaft to transmit torque between said driving shaft and said paddle shaft, said straight portion of said spring loop being flexible outwardly by said flat surface on said driving shaft to provide for slipping between said driving shaft and said paddle shaft when the rotation of said paddle means is stopped by the rising material.

2. The improvement according to claim 1, in which said hollow driven end portion of said paddle shaft is formed with a peripheral groove for receiving and retaining said generally semicircular portion of said spring loop.

3. A level indicator according to claim 1, in which said spring loop is made of spring wire.

4. A slip clutch for a level indicator or the like, comprising a rotatable driven shaft having a hollow end portion with an axial bore therein, a rotatable driving shaft rotatably received in said bore, and a generally D-shaped open spring loop mounted around said hollow end portion of said driven shaft, said spring loop having a substantially straight portion and a generally semicircular portion with one end thereof connected to one end of said straight portion, said hollow end portion of said driven shaft having a cutaway portion forming flat surface means communicating with said bore, said driving shaft having a flat surface on one side thereof, said straight portion of said spring loop being initially in engagement with said flat surface on said driving shaft and said flat surface means on said driven shaft to transmit torque between said driving shaft and said driven shaft, said spring loop being rotatable with said driven shaft, said straight portion of said spring loop being flexible outwardly by said flat surface on said driving shaft to provide for slipping between said driving shaft and said driven shaft when the torque being transmitted by said clutch exceeds a predetermined value.

5. A slip clutch according to claim 4, in which said hollow end portion of said driven shaft is formed with a peripheral groove for receiving and retaining said generally semicircular portion of said spring loop.

6. A slip clutch according to claim 4, in which said spring loop is made of spring wire.

7. A slip clutch for a level indicator or the like, comprising a rotatable driven shaft having a hollow end portion with an axial bore therein, a rotatable driving shaft rotatably received in said bore, and a spring loop mounted around said hollow end portion of said driven shaft for rotation therewith, said hollow end portion of said driven shaft having a cutaway portion forming a recess communicating with said bore, said driving shaft having a generally flat surface on one side thereof, said spring loop extending into said recess and initially into engagement with said flat surface on said driving shaft to transmit torque between said driving shaft and said driven shaft, said spring loop being flexible outwardly by said flat surface on said driving shaft to provide for slippage between said driving shaft and said driven shaft when the torque being transmitted by said slip clutch exceeds a predetermined value.

8. A slip clutch according to claim 7, in which said hollow end portion of said driven shaft is formed with a peripheral groove for receiving and retaining said spring loop.

9. A slip clutch according to claim 7, in which said spring loop is made of spring wire.

10. A slip clutch for a level indicator or the like, comprising a rotatable first shaft having a hollow end portion with an axial bore therein, a rotatable second shaft rotatably received in said bore, and a spring loop mounted around said hollow end portion of said first shaft for rotation therewith, said hollow end portion of said first shaft being formed with a recess communicating with said bore, said second shaft having a cam portion on one side thereof, said spring loop extending into said recess and initially into engagement with said cam portion on said second shaft to transmit torque between said shafts, said spring loop being flexible outwardly by said cam portion on said second shaft to provide for slippage between said shafts when the torque being transmitted by said slip clutch exceeds a predetermined value.

11. A slip clutch according to claim 10, in which said spring loop includes an arm portion received in said recess and engageable by said cam portion on said second shaft.

12. A slip clutch according to claim 10, in which said spring loop is made of spring wire.

* * * * *

UNITED STATES PATENT AND TRADEMARK OFFICE
CERTIFICATE OF CORRECTION

PATENT NO. : 4,318,624
DATED : March 9, 1982
INVENTOR(S) : Richard G. Jett

It is certified that error appears in the above-identified patent and that said Letters Patent are hereby corrected as shown below:

On the title page, the following should be added:

-- [73] Assignee: Ludlow Industries, Inc.,
                  Elburn, Ill.    --

Column 3, line 18, "prevent" should be -- prevents --

Column 3, line 23, "lip" should be -- slip --

*Signed and Sealed this*

*Twenty-second* Day of *June 1982*

[SEAL]

*Attest:*

*Attesting Officer*

GERALD J. MOSSINGHOFF

*Commissioner of Patents and Trademarks*